(12) United States Patent
Nishimori et al.

(10) Patent No.: US 7,460,433 B2
(45) Date of Patent: Dec. 2, 2008

(54) ULTRASONIC WAVE TRANSMITTING AND RECEIVING SYSTEM FOR DETECTING UNDERWATER OBJECTS

(75) Inventors: Yasushi Nishimori, Nishinomiya (JP); Akira Okunishi, Nishinomiya (JP); Kouzo Tokuyama, Nishinomiya (JP); Koji Yokuda, Nishinomiya (JP)

(73) Assignee: Furuno Electric Company, Limited, Hyogo (JP)

( * ) Notice: Subject to any disclaimer, the term of this patent is extended or adjusted under 35 U.S.C. 154(b) by 413 days.

(21) Appl. No.: 10/554,995

(22) PCT Filed: Apr. 16, 2004

(86) PCT No.: PCT/JP2004/005445

§ 371 (c)(1),
(2), (4) Date: Nov. 1, 2005

(87) PCT Pub. No.: WO2004/099815

PCT Pub. Date: Nov. 18, 2004

(65) Prior Publication Data

US 2006/0236770 A1 Oct. 26, 2006

(30) Foreign Application Priority Data

May 9, 2003 (JP) ............................. 2003-131986

(51) Int. Cl.
H04B 1/59 (2006.01)

(52) U.S. Cl. ......................................................... 367/2

(58) Field of Classification Search ..................... 367/2, 367/99
See application file for complete search history.

(56) References Cited

U.S. PATENT DOCUMENTS 5,377,163 A * 12/1994 Simpson ..................... 367/131
2006/0236770 A1* 10/2006 Nishimori et al. ............. 73/620

FOREIGN PATENT DOCUMENTS

| JP | 59-046876 | 3/1984 |
| JP | 60-8883 U | 1/1985 |
| JP | 60-33074 A | 2/1985 |
| JP | 63-52715 B2 | 10/1988 |
| JP | 1-12220 Y2 | 4/1989 |
| JP | 3-16072 Y2 | 4/1991 |
| JP | 2003-185746 A | 7/2003 |

* cited by examiner

*Primary Examiner*—Dan Pihulic
(74) *Attorney, Agent, or Firm*—Birch, Stewart, Kolasch & Birch, LLP

(57) ABSTRACT

A trawl net (2) is attached to ends of warps (4) extending from a ship (6), such as a trawl boat, in the sternward direction, and a transponder (5) to transmit a response signal is attached to an upper part of a net mouth of the trawl net (2). The ship (6) forms a transmission beam TB of a detection signal by a transducer (1) at the bottom of the ship, and performs detection in the detection range. The transponder (5) receives the detection signal, and forms a transmission beam TPB of a frequency different from that. A detection image and a position display image of the transponder are superposed and displayed on a display of a scanning sonar or are displayed side by side.

3 Claims, 15 Drawing Sheets

DIRECTLY DOWNWARD DIRECTION

DIRECTLY DOWNWARD DIRECTION

ULTRASONIC WAVE TRANSMITTING AND RECEIVING SYSTEM FOR DETECTING UNDERWATER OBJECTS

TECHNICAL FIELD

The present invention relates to an ultrasonic transmitting and receiving system for detecting underwater objects by transmitting and receiving ultrasonic waves.

BACKGROUND ART

For example, in a trawling method, a scanning sonar is effectively used to search for a fish school to be found, tracked and captured. With a search for a fish school, although detectability varies depending on the size of the fish school, a school of sardine or herring, for example, can be searched from several hundred to several thousand meters away. When a fish school is found, fish tracking is performed by turning or controlling a ship so that the fish school is positioned in the bow direction of the ship, and after catching up with the fish school and running just upon the fish school, the fish school is captured by being driven into a backward trawl net of the ship as the ship runs. At that time, the point is how the net mouth of the trawl net is suitably guided to the fish school.

The position and depth of the net mouth can be controlled by ship handling and towing speed. However, for that purpose, the position and speed of the net mouth have to be grasped accurately. Accordingly, in the trawling fishing method, it is not too much to say that the fishing efficiency depends on the performance of an apparatus for monitoring the position and depth of the net mouth.

Hitherto, the position and depth of the net mouth can be monitored by a method in which a transponder is attached to the net mouth, a response signal of the transponder is received by two or three wave receivers attached to the bottom of the ship, and a phase difference of those received signals is obtained to know the direction of the transponder, that is, the direction of the net mouth. Besides, JP-B-1-53751 (patent document 1) or JP-UM-B-5-2874 (patent document 2) disclose a system in which a scanning sonar is used, plural transponders are provided at the center of a net, and a fish school signal (echo) and a net position signal using the same frequency are displayed in a superposition state.

In the former method using the phase difference measurement, signals reflected by the sea surface or the sea bottom and through multi-pass routes are mixed to the direct wave from the transponder, and there has been a defect that a wrong direction is erroneously detected or position detection is difficult to perform stably. Besides, in the system disclosed in patent document 1 or 2, there have been following problems to be solved.

First, with respect to the detection of the transponder, the system disclosed in patent document 2 requires another display device dedicated to the transponder for displaying the echo signal. Besides, in order to detect the frequency, specific units such as a pressure sensor and a VF conversion circuit are required. Further, since the transponder is detected by a vertically wide beam, there has also been a problem that a high SN ratio can not be obtained. In the system disclosed in patent document 1, there has been a problem that it is impossible to distinguish between the echo signal and the response signal of the transponder since their frequencies are the same. Besides, with respect to both systems disclosed in patent documents 1 and 2, when the receiving frequency band is made narrow in order to raise the detection probability of the response signal of the transponder, the influence of the Doppler shift comes to be liable to exert. That is, the SN ratio and the Doppler shift resistance have the relation of trade-off.

With respect to the position display of the transponder, the system disclosed in patent document 1 has a problem that the depth information of the transponder is difficult to grasp.

Besides, with respect to the activation of the transponder, in the system disclosed in patent document 1, activation of the transponder and detection cannot be optimized independently because they are processed in common. For example, it has been necessary that signals for transponder activation and for detection have to be transmitted and received at the same tilt angle. Besides, there has been a problem that the sound pressure of the signal to the transponder lowers as the distance to the transponder elongates, and, as a result, the activation of the transponder becomes difficult.

An object of the invention is therefore to provide an ultrasonic transmitting and receiving system in which the foregoing problems are solved, a specified detection area can be detected, and a position of a transponder put in water can be certainly monitored.

DISCLOSURE OF THE INVENTION

The invention is characterized by including a sonar apparatus equipped on a ship and detecting underwater objects by a transmission beam formed with a detection signal and at least a reception beam formed with echo signals, and a transponder in water, comprising the transponder transmitting a response signal having a frequency band different from a frequency band of the detection signal in response to an activation signal transmitted from the sonar apparatus and received thereby, and the sonar apparatus including a transmission beam former for transmitting the detection signal in a form of transmission beam, a reception beam former for receiving an echo signal produced by an object reflecting the detection signal and the response signal, and an indicator for displaying the echo signal and the response signal.

As stated above, since the transponder transmits the response signal of the frequency band different from the frequency band of the detection signal transmitted from the sonar apparatus, the echo signal and the response signal can be processed with these signals being distinguished from each other.

Besides, the invention is characterized in that the activation signal is made a signal having a frequency band different from the frequency band of the detection signal. By this, the transponder can be activated independently of the detection by the detection signal, and detection processing and transponder activation can be respectively optimized.

Besides, the invention is characterized in that the transmission beam former includes sections for separately forming the transmission beam of the detection signal to a detection range and a transmission beam of the activation signal to the transponder. By this, the detection of a fish school or the like and the activation of the transponder can be performed independently.

Besides, the invention is characterized in that the transmission beam former forms the transmission beam of the activation signal to the transponder according to an azimuth or a tilt angle from the sonar to the transponder. By this, even the transponder existing at a very distant place can receive the activation signal of not less than a sound pressure necessary for activation, and a usable distance of the transponder is greatly extended.

Besides, the invention is characterized in that the transmission beam former performs formation of the transmission beam of the detection signal and formation of the transmission beam of the activation signal to the transponder by one transmission and reception sequence.

By this, an update period of a detection image updated by repeating transmission and reception is not changed, and the detection and the activation of the transponder can be independently processed.

Besides, the invention is characterized in that the transmission beam former forms transmission beams to respectively perform detection in a vertical plane substantially vertical to a water surface and including a position of the transponder and in a plane having a specified tilt angle and including the position of the transponder, the reception beam former forms reception beams in the vertical plane and the plane having the specified tilt angle, and the indicator includes sections for collectively displaying images of the echo signal and the response signal in the vertical plane and the plane having the specified tilt angle.

By this, depth information of the transponder can be easily grasped.

According to the invention, since the transponder transmits the response signal having the frequency different from the frequency band of the detection signal transmitted from the sonar, the echo signal and the response signal are distinguished and the signal processing can be performed.

Besides, according to the invention, since the activation signal of the transponder is made the signal having the frequency band different from the frequency band of the detection signal, the transponder can be activated independently of the detection by the detection signal, and the detection processing and the transponder activation can be respectively optimized.

Besides, according to the invention, since the scanning sonar includes the sections for separately forming the transmission beam of the detection signal to the detection range and the transmission beam of the activation signal to the transponder, the detection of a fish school or the like and the activation of the transponder can be performed independently.

Besides, according to the invention, since the transmission beam former forms the transmission beam of the activation signal to the transponder according to the azimuth from the sonar to the transponder or the tilt angle, even the transponder existing at a very distant place can receive the activation signal of not less than the sound pressure necessary for the activation, and the usable distance of the transponder is greatly extended.

Besides, according to the invention, since the formation of the transmission beam of the detection signal to the detection range and the formation of the transmission beam of the activation signal to the transponder are performed by one transmission and reception sequence, the update frequency of the detection image updated by repeating the transmission/reception is not changed, and the detection and the activation of the transponder can be independently processed.

Besides, according to the invention, since the transmission beams and the reception beams are formed which respectively perform detection in the plane substantially vertical to the water surface and including the position of the transponder and in the plane having the specified tilt angle and including the position of the transponder, and there is provided section for collectively displaying the images of the echo signals and the response signals in the vertical plane and the plane of the specified tilt angle, the depth information of the transponder can be easily grasped.

BEST MODE FOR CARRYING OUT THE INVENTION

A scanning sonar according to a first embodiment will be described with reference to FIGS. 1 to 13.

Figure 1:
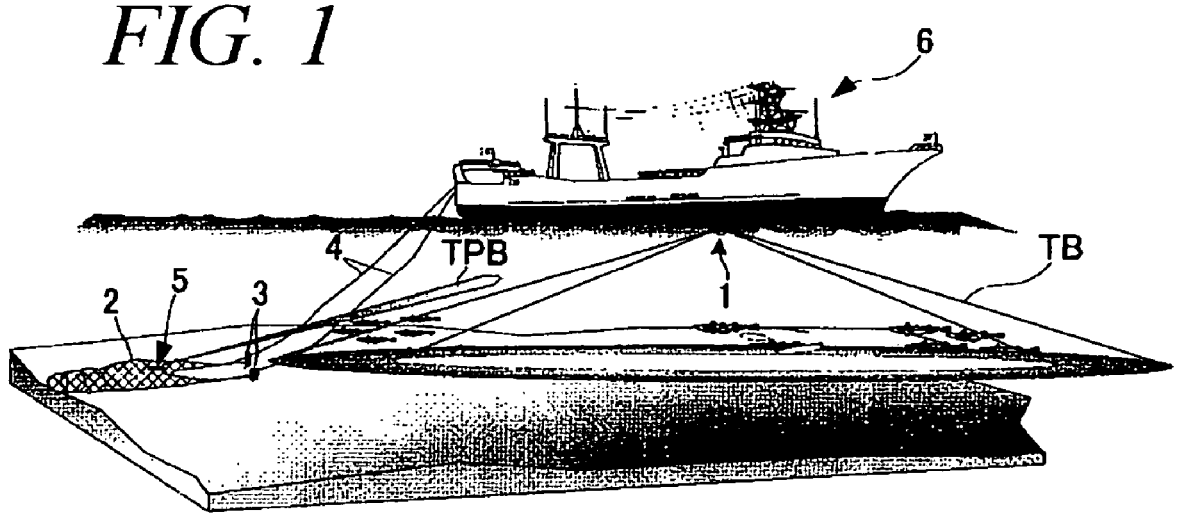
FIG. 1 is a view showing a positional relation among a ship, a detection range, and a transponder.

FIG. 1 shows an example in which an ultrasonic transmitting and receiving system is applied to a trawling method. Here, the ship bottom of a ship (trawl boat) 6 is provided with a transducer 1 of a scanning sonar which forms a specified transmission beam and reception beam and performs detection in a specified detection range. A trawl net 2 is towed behind the ship 6 by warps 4. A transponder 5 is attached to a net mouth of the trawl net 2. Otter boards 3 are provided at engagement portions between the warps 4 and the trawl net 2, and the opening of the net mouth is controlled by the towing speed of the trawl net 2 There is a case where the transponder 5 is attached to the two otter boards 3.

Besides, in FIG. 1, TB denotes an umbrella-like transmission beam. The detection range is formed of the transmission beam TB and a reception beam. When receiving a detection signal or an activation signal for the transponder, the transponder 5 transmits a response signal in a direction along the warp 4, that is, in a direction toward the ship 6. In the drawing, TPB denotes a transmission beam of the response signal. The ultrasonic transmitting and receiving system receives the response signal from the transponder 5 through the transducer 1.

Search and finding of a fish school is performed in front (bow direction) of the ship 6 in the umbrella-like detection range, and tracking is performed behind (sternward direction) the ship 6 in the umbrella-like detection range, so that the fish school to be captured by the trawl net 2 is detected. At this time, since the warp length of the warp 4 is, for example, 1 km, and the water depth of the trawl net 2 is, for example, approximately 100 m, a tilt angle of the transmission beam TB of the detection signal indicates almost the horizontal direction.

Figure 2A:
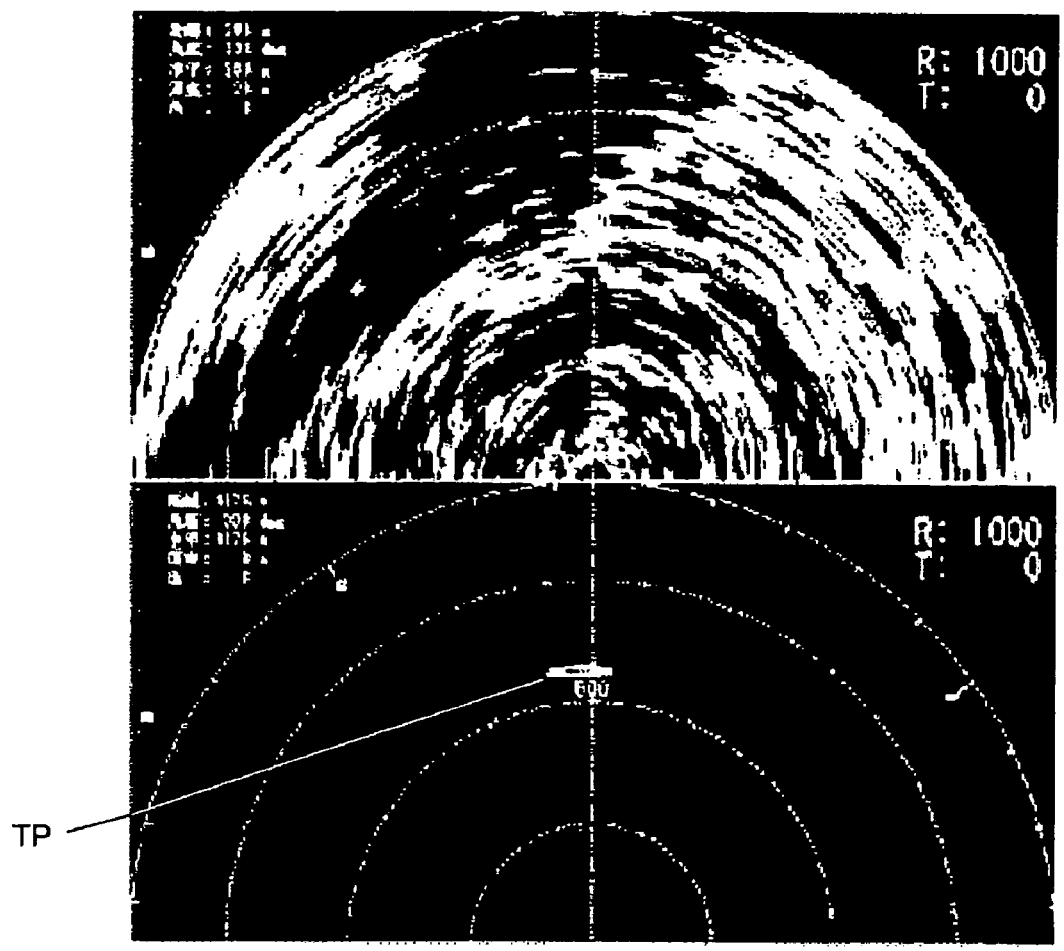
FIGS. 2A and 2B are views showing examples of detection images in an H mode and position displays of a transponder.
Figure 2B:
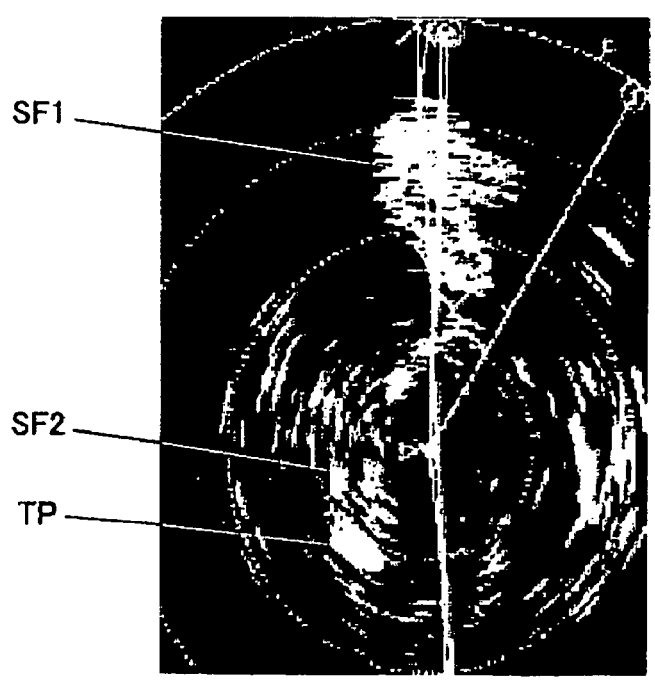

FIGS. 2A and 2B show display examples on a display screen of the sonar. Here, FIG. 2A shows, on its upper half, a detection image in the sternward direction of the ship, and shows, on the lower part of the screen, a position of the transponder viewed in the same direction. A fish school, together with wharf, sea bottom, sea surface reflection, and the like, is displayed on the detection image of the upper half. Differently from the upper half detection image, only the position of the transponder is displayed on the lower half position display image of the transponder.

In this example, although the range of 180° in the sternward direction is displayed, both the detection image and the position display image of the transponder can be displayed in a range of 360°. In that case, the position display of the transponder is superposed on the detection image and they are displayed. At this time, a curve of color change in accordance with the signal intensity is made different between the detection image and the position display image of the transponder, so that the position of the transponder is displayed as the image different in color tone in the detection image. By this, the position of the transponder in the detection image can be clearly gasped.

FIG. 2B shows an example in which a detection image and a position display of a transponder are superposed on each other and are displayed. In the figure, the upper part indicates the bow direction. In this example, a white position display image TP of the transponder appears on the port quarter. An image SF1 of a fish school appears in the bow direction, and an image SF2 of a fish school appears in the vicinity of the sternward transponder. In the situation as stated above, the ship is subsequently controlled so that it catches up with the fish school appearing as the image SF1 in the bow direction, passes through the place just above the fish school, and drives the fish school into the trawl net.

Figure 3:
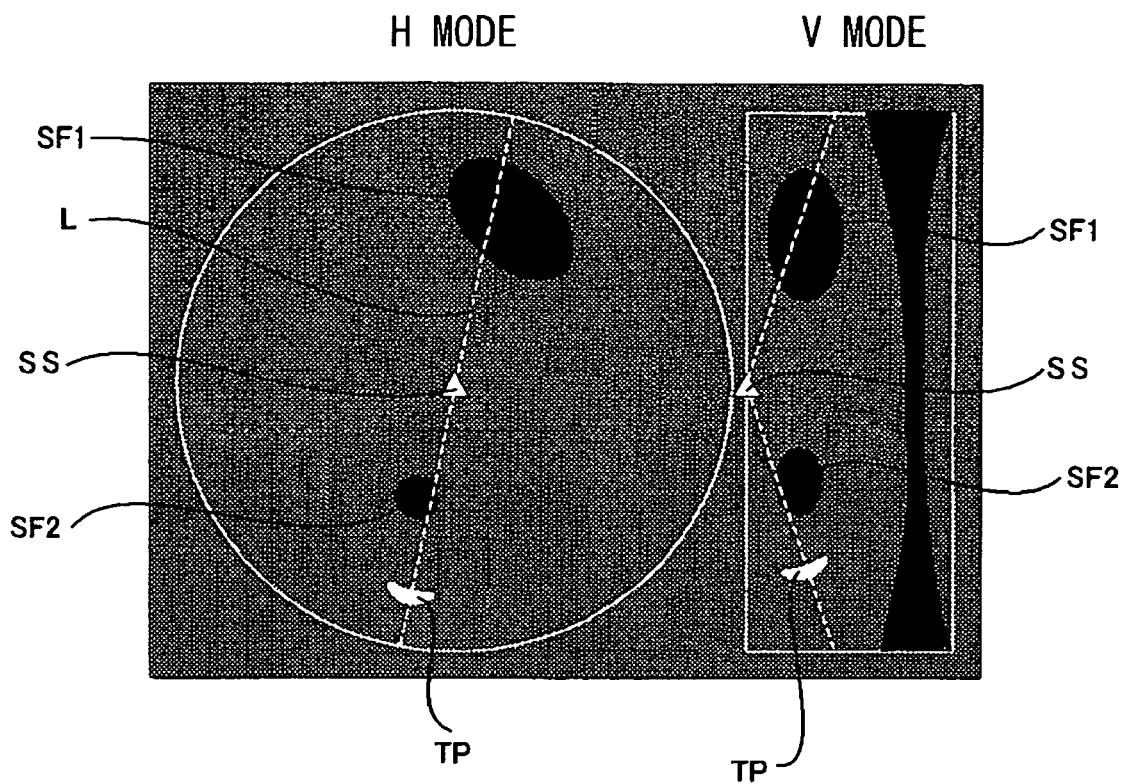
FIG. 3 is a view showing an example in which detection images in an H mode and a V mode and positions of a transponder are collectively displayed.

FIG. 3 shows an example in which both an H mode to perform detection in a substantially horizontal plane with a specified tilt angle and a V mode to perform detection in a vertical plane are displayed together. Here, SS denotes a position of the ship. On the display screen of the H mode, similarly to that shown in FIG. 2B, there appear a fish school SF1 in the bow direction, a fish school SF2 in the sternward direction, and a position display image TP of a transponder. The display screen of the V mode is a vertical section including a straight line L in the display screen of the H mode. When both the image of the H mode and the image of the V mode are seen together, the positional relation between the transponder (that is, the net mouth of the trawl net) and the fish school in the depth direction can be easily grasped.

Figure 4:
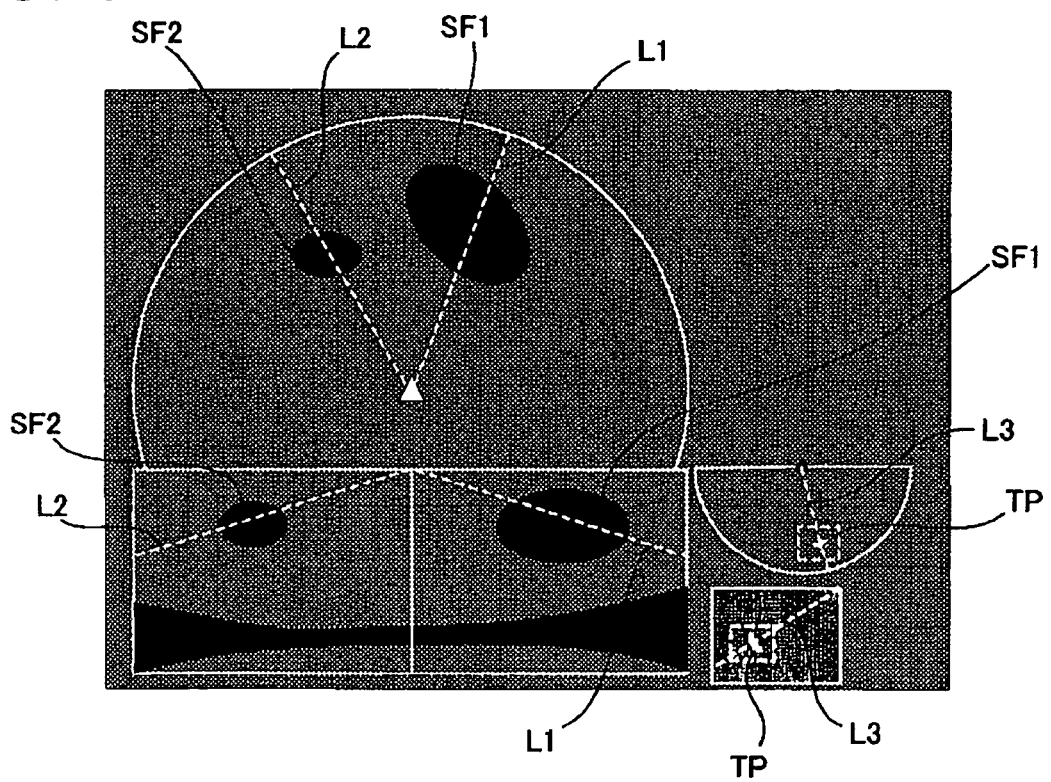
FIG. 4 is a view showing an example in which a detection image in an H mode, detection images in two directions in a V mode, and positions of a transponder in the H mode and the V mode are collectively displayed.

FIG. 4 shows an example in which the detection image and the position of the transponder are separately displayed on the same screen. Here, the upper left on the screen shows the detection image in the H mode, and the lower left shows the detection image in the V mode. The lower right shows the position display of the transponder in the V mode, and the part above that shows the position display of the transponder in the H mode. Each of straight lines L1, L2 and L3 indicates azimuths in the H mode or a tilt angle in the V mode. The screen in the V mode indicates the vertical sectional image at the straight line L1, L2, L3 in the H mode.

As stated above, when the detection image of a fish school or the like and the position display of the transponder are displayed side by side, the position of the transponder is more clearly displayed, and the relation between them can be easily grasped.

Figure 5:
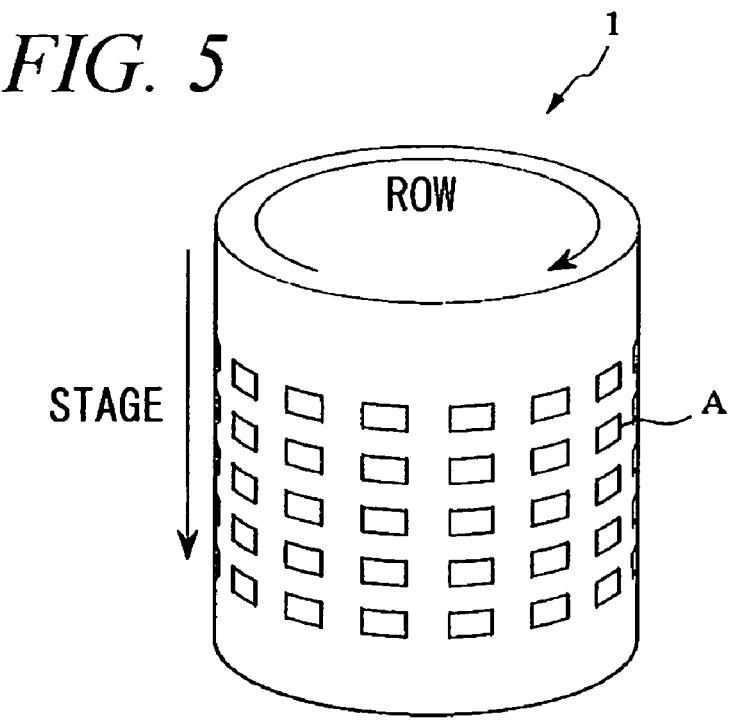
FIG. 5 is a perspective view showing a structural example of a transducer.

FIG. 5 is a structural view of the transducer used for the scanning sonar. As shown in FIG. 5, the transducer 1 includes an array of plural stage and plural row ultrasonic oscillators. This transducer 1 is installed on the bottom of the ship so that the axis of the cylinder becomes vertical.

Figure 6A:
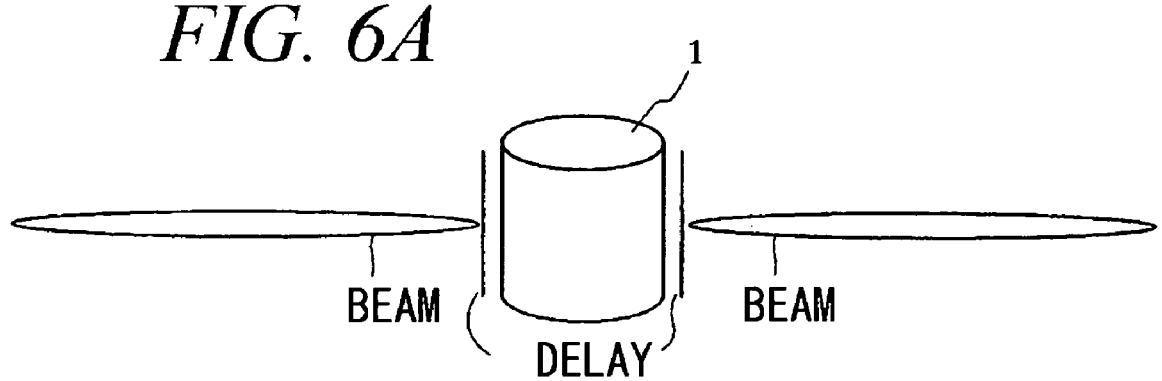
FIGS. 6A and 6B are views for explaining formation of a transmission beam.
Figure 6B:
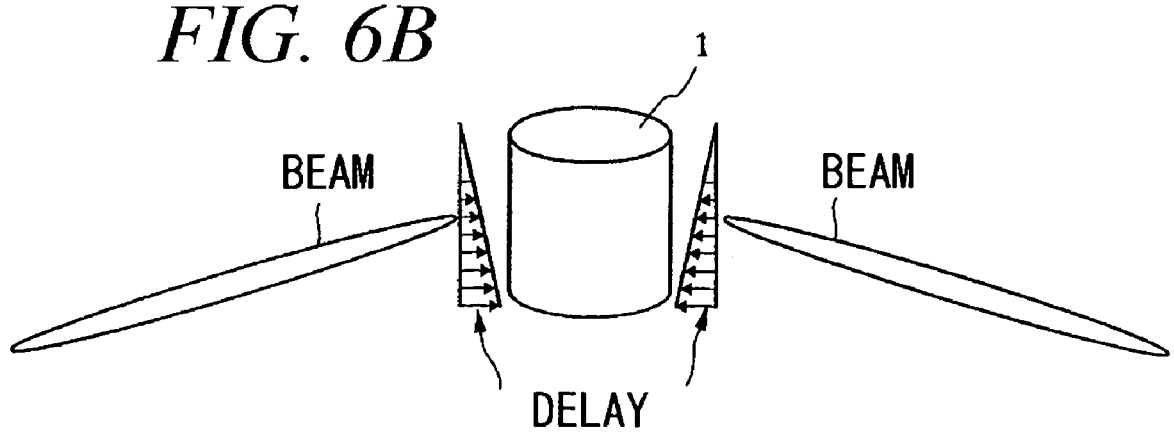

FIGS. 6A and 6B are views for explaining a transmission beam. FIG. 6A shows the directivity of a transmission beam formed in the case where search is performed in all horizontal directions. FIG. 6B shows a transmission beam formed in the case where search is performed in all directions of a specified tilt angle. When the respective oscillators are driven, a delay time at a lower stage of the transducer 1 is made longer, so that the umbrella-like transmission beam is tilted downward by a specified angle.

Figure 7A:
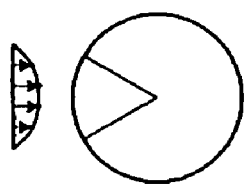
FIGS. 7A, 7B, 7C, 7D, 7E and 7F are views for explaining formation of a reception beam.
Figure 7B:
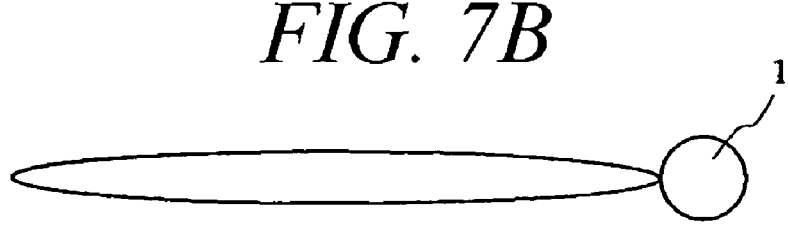

FIGS. 7A, 7B, 7C, 7D, 7E and 7F are views for explaining a reception beam. With respect to the reception beam, oscillators of plural rows continuous in the circumstantial direction of the transducer 1 are used as a set. When received signals of the oscillators of plural rows continuous by a predetermined number are combined, as shown in FIG. 7A, they are combined while a phase at a part closer to the center of the continuous plural rows is more delayed, so that as shown in FIG. 7B, the directionality in the horizontal direction is sharpened. Besides, a delay time is set in the stage direction of the transducer 1, so that the tilt angle is controlled, and the directionality in the vertical direction is also sharpened. By this, the so-called pencil-type reception beam is formed.

Figure 7C:
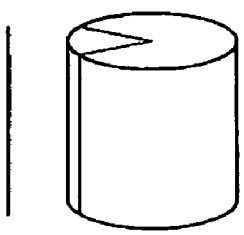
Figure 7D:
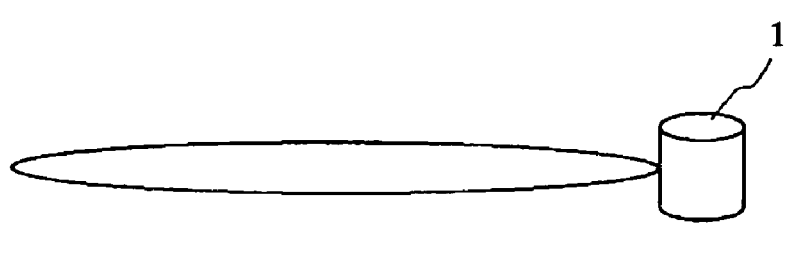
Figure 7E:
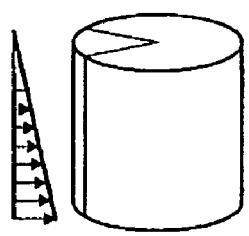
Figure 7F:
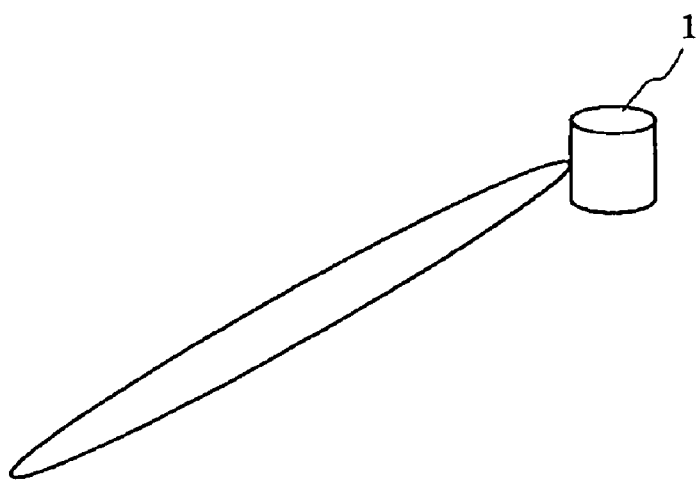

FIG. 7C shows an example in which the delay time is made constant, and as shown in FIG. 7D, the reception beam is directed to the horizontal direction. FIG. 7E shows an example in which a delay time in a lower stage is made longer, and as shown in FIG. 7F, the reception beam is tilted downward.

The umbrella-like transmission beam is formed as stated above, and reception is performed by the pencil-type reception beam at a specified azimuth in the transmission beam, so that detection is performed in the umbrella-like detection range.

Figure 8:
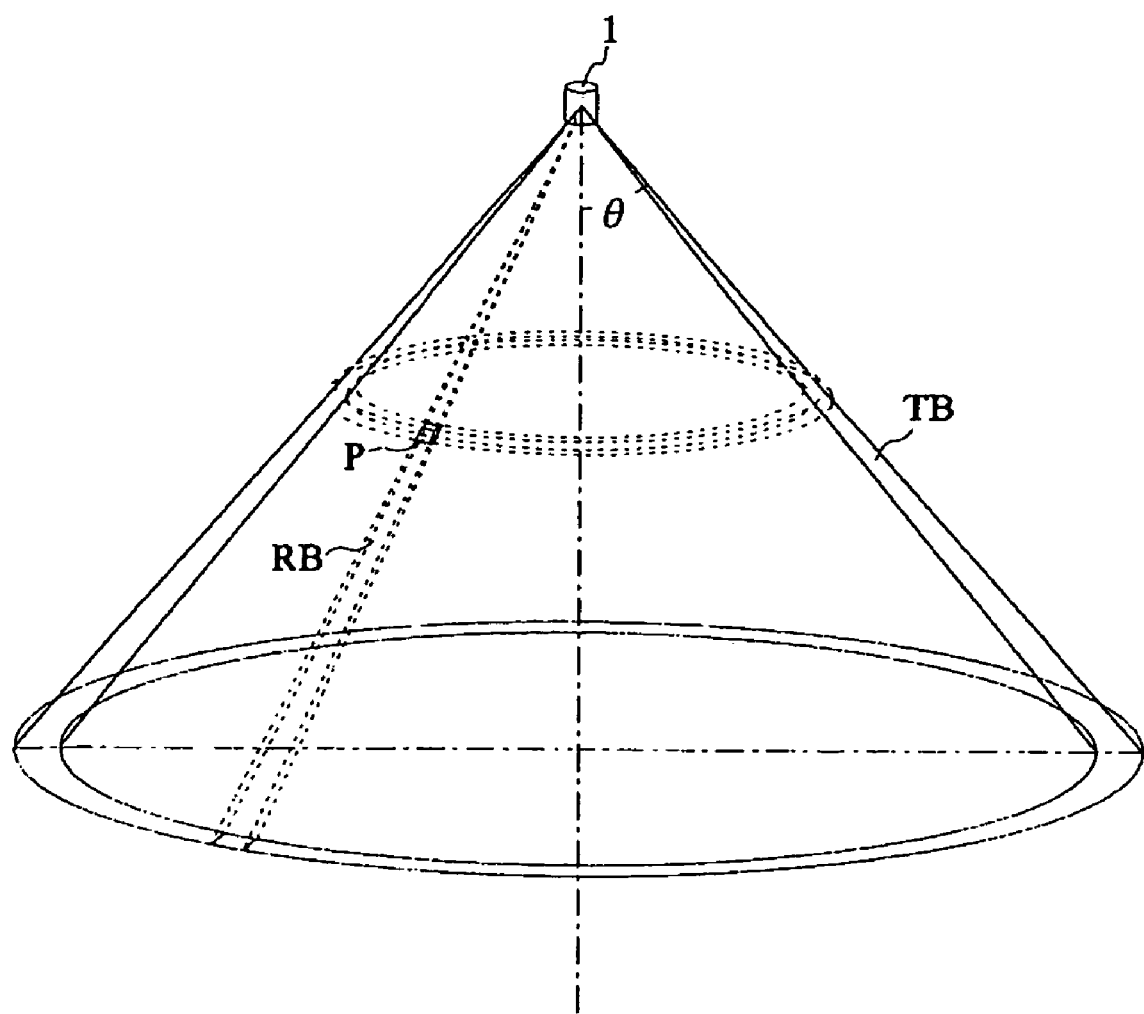
FIG. 8 is a view showing a relation among a transmission beam, a reception beam, and a detection range.

FIG. 8 is a view showing the detection range by the transmission beam and the reception beam. Here, TB denotes an umbrella-like transmission beam, and RB denotes a pencil-type reception beam. With respect to the azimuth direction, the reception beam RB is formed at a resolution corresponding to the number of oscillators in the row direction of the transducer 1. Besides, with respect to a distance direction, the detection image data is sequentially formed with respect to an arbitrary section P in the transmission beam TB at a resolution corresponding to a sampling period on the time axis.

In FIG. 8, the transmission beam is directed to the horizontal ($\theta=90°$) direction or is tilted by a specified angle therefrom, so that the detection in the H mode is performed.

Incidentally, in the example shown in FIG. 6A or 6B, although the example in which the umbrella-like transmission beam is formed is shown, as described later, in the case where the activation signal of the transponder is optimized, the pencil-type transmission beam is formed for the transponder. In that case, phase controls shown in FIGS. 7A to 7F are applied at the time of transmission. That is, as shown in FIG. 7A, a phase at a part closer to the center of the continuous plural rows is more delayed and vibration is performed, so that as shown in FIG. 7B, the directionality in the horizontal direction is sharpened. Besides, a delay time is set in the step direction of the transducer 1, so that the tilt angle is controlled, and the directionality in the vertical direction is also sharpened. By this, the pencil-type transmission beam is formed.

Although the example described above uses the transducer in which the plural oscillators are arranged on the cylindrical surface, a transducer in which plural oscillators are arranged on the whole surface of a spherical surface or a partial surface thereof may be used.

Figure 9A:
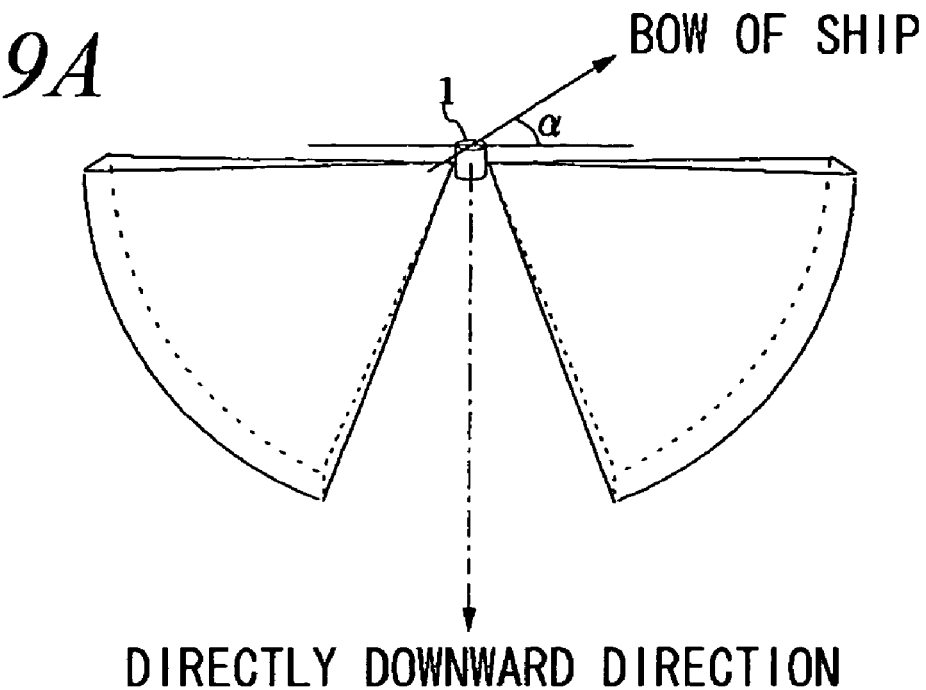
FIGS. 9A and 9B are views showing examples of a detection range at the time of detection in the V mode.
Figure 9B:
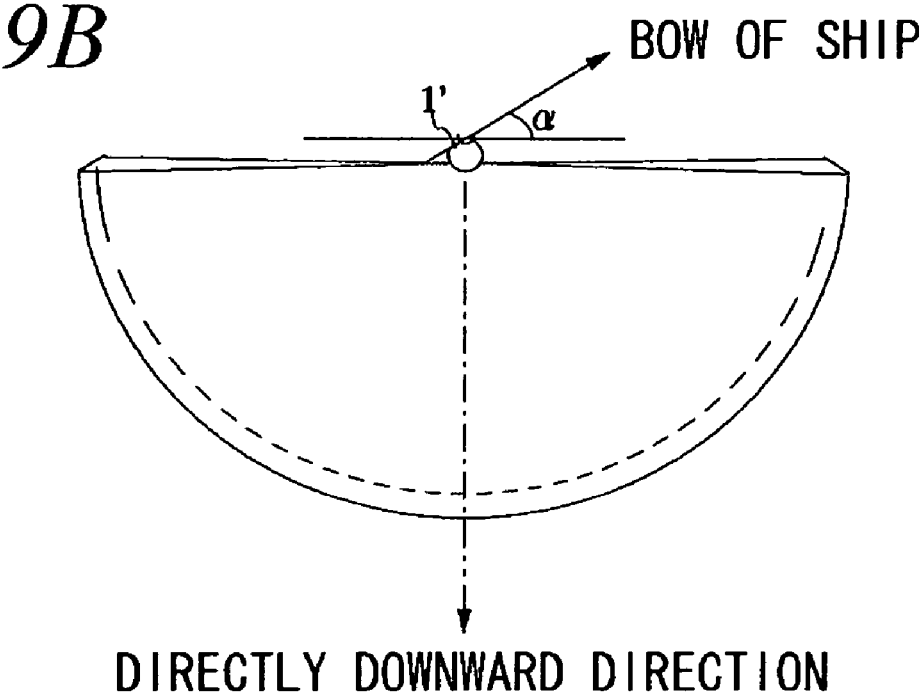

FIGS. 9A and 9B are views showing examples in which the above transducer is used and the detection in the V mode is performed. FIGS. 9A and 9B show detection ranges of a vertical plane having a bearing angle a with respect to the bow of the ship indicated by an arrow. FIG. 9A shows an example of a case where the cylindrical transducer 1 is used, and FIG. 9B shows an example in which a spherical transducer 1' is used. As stated above, in the detection of the V mode, detection is performed in the range extending like a fan along the vertical plane.

As stated above, the transmission beam extending like the fan along the vertical plane with the specified bearing angle a shown in FIG. 9A or 9B is formed, and the tilt angle of the pencil-type reception beam is sequentially changed at high speed along the fan shape, that is, scanning of the reception beam is performed, so that the detection of the V mode is performed.

Figure 10A:
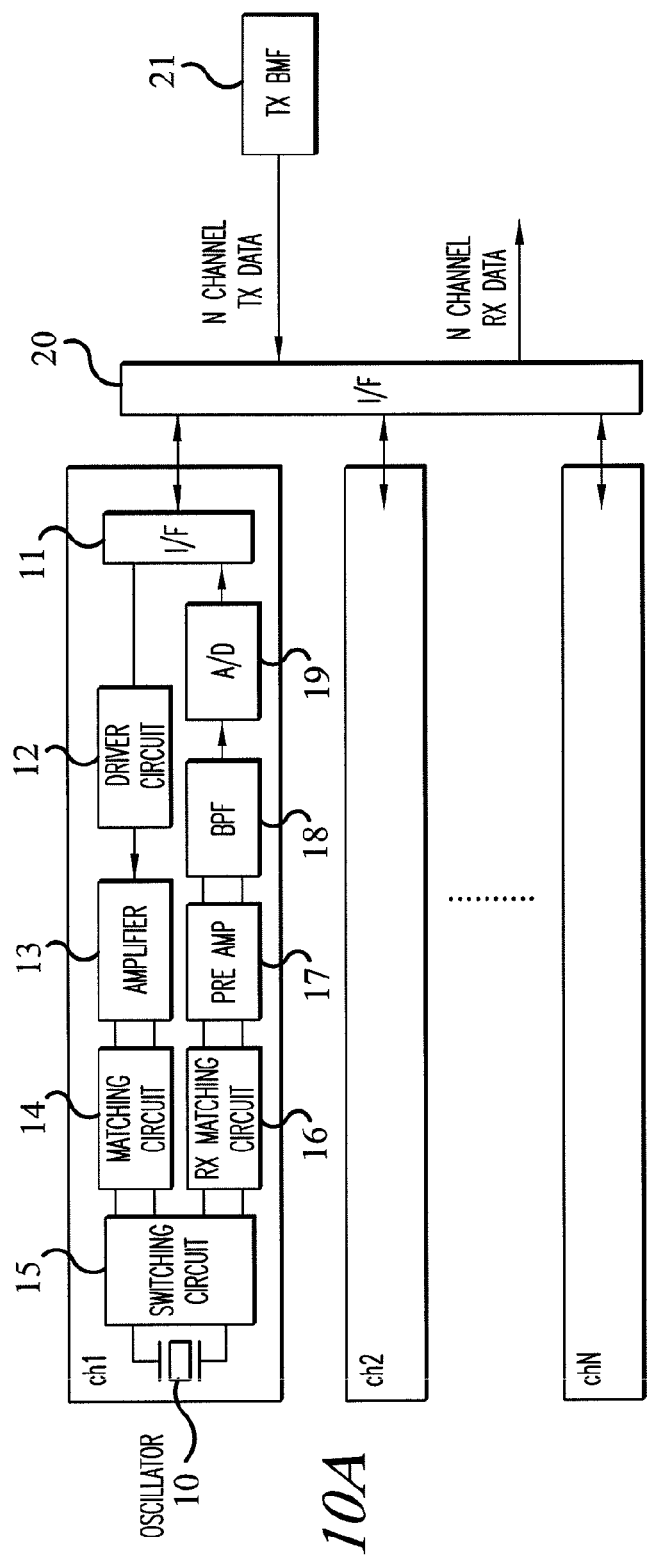
FIGS. 10A and 10B are block diagrams showing a structure of a transmission/reception channel of a scanning sonar and a received signal processing part.

FIG. 10A is a block diagram showing a structure of a transmission/reception channel of a scanning sonar. In FIG. 10A, a programmable transmission beam former 21 gives transmission control data (TX data) to each of transmission and reception channels. An interface 11 switching-controls each drive element of a driver circuit 12 based on the transmission control data given from the programmable transmission beam former 21 through the interface 20. By this, the driver circuit 12 outputs a pulse width modulated transmission signal. A TX amplifier circuit 13 amplifies the transmission signal, and drives an oscillator 10 through a transmission matching circuit 14 and a transmission and reception switching circuit 15. The transmission and reception switching circuit 15 guides the output signal of the TX amplifier circuit 13 to the oscillator 10 in a transmission period, and guides the signal outputted from the oscillator 10 as a received signal to a reception matching circuit 16 and a preamplifier 17 in the reception period. The preamplifier 17 amplifies this received signal, and a band pass filter 18 removes a noise component other than a frequency band of the received signal. An A/D converter 19 samples the signal of the reception frequency band at a specified sampling period, and converts it into digital data row.

The above portions constitute a transmission and reception channel ch1. Such transmission and reception channels the number of which is equal to the number of the oscillators 10 are provided as indicated by ch2, ch3, . . . chN.

In the case where detection in the H mode is performed, the programmable transmission beam former 21 generates transmission control data to control the phase and weight with which each transmission and reception channel drives an oscillator, so that an umbrella-like transmission beam is formed at a specified tilt angle. Besides, in the case where detection in the V mode is performed, transmission and reception control data is generated to control the phase and weight with which each transmission and reception channel drives an oscillator, so that the transmission beam extending like the fan along the vertical plane with the specified bearing angle α shown in FIG. 9A or 9B is formed. Further, as described later, in the case where the activation signal of the transponder is optimized, in order to form the transmission beam of the activation signal to the transponder, transmission control data is generated to control the phase and weight with which each transmission and reception channel drives an oscillator, so that the pencil-type transmission beam of a specified azimuth and a specified tilt angle is formed.

Figure 10B:
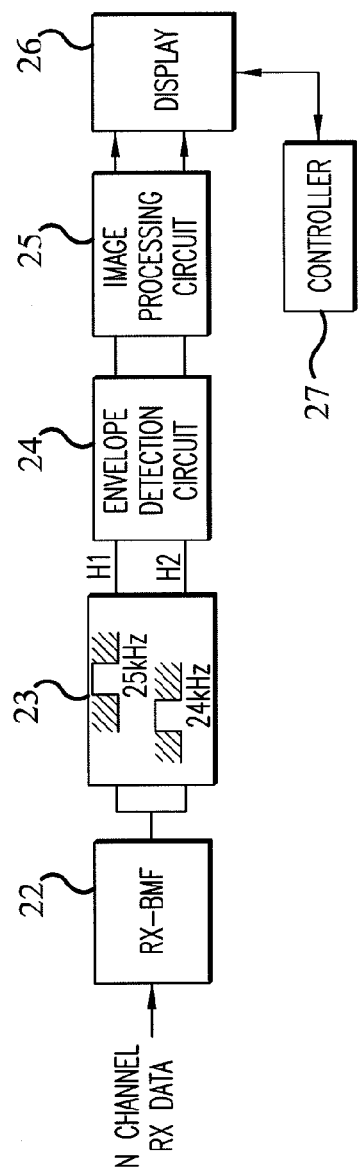

FIG. 10B is a block diagram of a received signal processing part which uses the plural transmission and reception channels ch1 to chN shown in FIG. 10A to form a reception beam and performs a detection image display in a specified detection range and a position display of the transponder. Here, based on the reception data of the N channels inputted from the interface 20 shown in FIG. 10A, a reception beam former 22 performs control of phases and weights of received signals by the respective oscillators and combines them to form the pencil beam type reception beam at a specified azimuth, and obtains received signals thereof. A filter 23 extracts a received signal H1 by an echo detection transmission and reception beam among the received signals by filtering (digital filter operation) of a band pass filter with a center frequency of 25 kHz. Besides, a received signal H2 by a reception beam for transponder detection is extracted by filtering of a band pass filter with a center frequency of 24 kHz. An envelope detection circuit 24 demodulates the two received signals H1 and H2 to obtain respective signal intensities. An image processing part 25 generates image data to display the detection image and the position of the transponder according to the signal intensities of the detected H1 and H2. A display operation part 26 includes a display part and an input operation part of a user interface, reads the operation content of an operator from a control part 27, and performs an image display based on a signal outputted from the image processing part 25. Besides, the display operation part 26 controls the respective parts shown in FIG. 10B. For example, setting of a tilt angle θ of a detection range at the time of display in the H mode, or a bearing angle α with respect to the bow of the ship at the time of display in the V mode, switching of the display mode and the like are performed.

Figure 11:
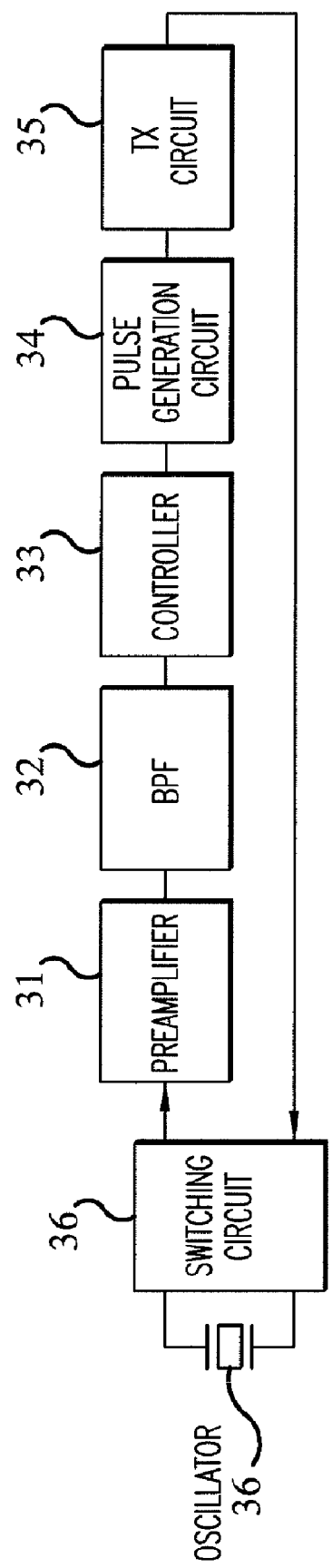
FIG. 11 is a block diagram showing a structure of a transponder.

FIG. 11 is a block diagram showing a structure of a transponder. Here, an oscillator 30 receives a detection signal or an activation signal from a sonar, and transmits a response signal. A transmission and reception switching circuit 36 is on standby in a normal reception mode, and gives a received signal by the oscillator 30 to a preamplifier 31. The preamplifier 31 amplifies this, and a band pass filter 32 allows a signal of a specified band with a center frequency band (25 kHz) for transponder activation to pass through. A control circuit 33 activates a pulse generation circuit 34 when an output signal of the band pass filter 32 exceeds a specified threshold. The pulse generation circuit 34 generates a tone burst wave of 24 kHz as a response signal. A transmission circuit 35 amplifies this, and switches the transmission and reception switching circuit 36 to the transmission side to drive the oscillator 30. By this, the response signal is transmitted.

Figure 12:
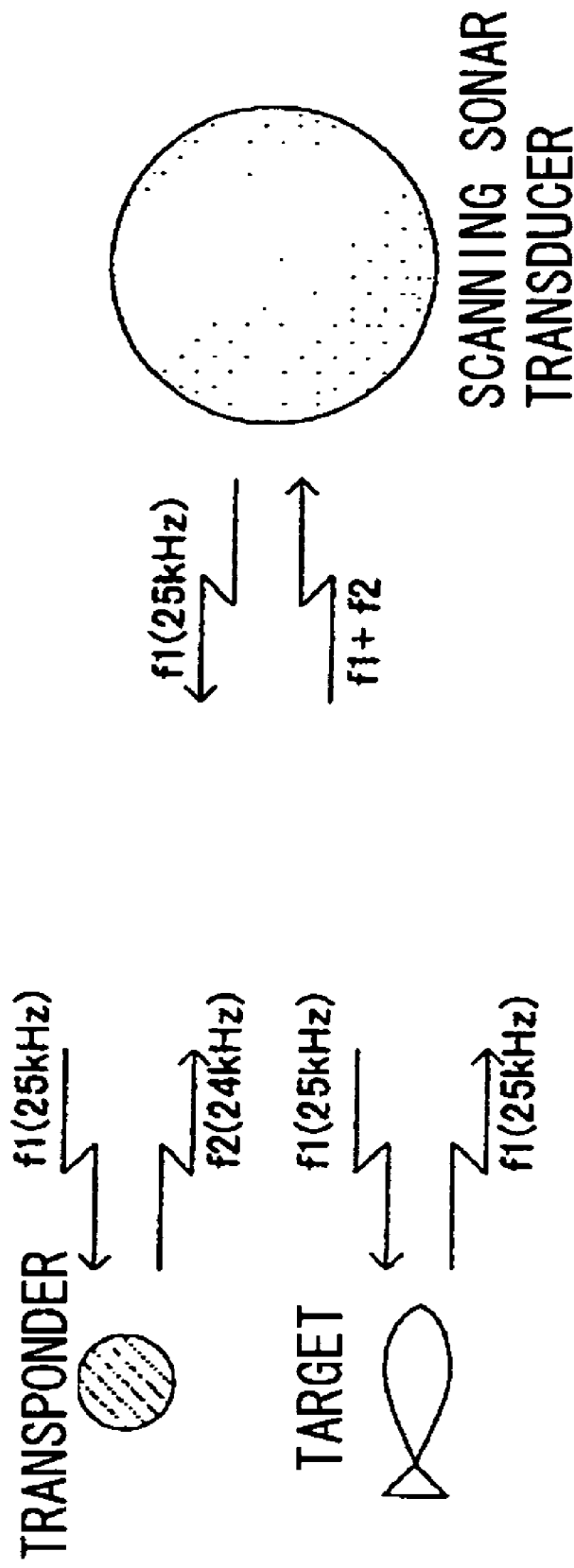
FIG. 12 is a view showing a relation of various signals among a transducer of a scanning sonar, a transponder and a target.

FIG. 12 shows a relation of transmission and reception signals among a transducer of a scanning sonar, a transponder, and a target such as a fish school. A detection signal f1 of 25 kHz is transmitted from the transducer of the scanning sonar. The transponder is activated by receiving this, and transmits a response signal f2 of 24 kHz. The target passively reflects the detection signal f1. By this, the transducer of the scanning sonar receives signals in which the echo signal f1 and the response signal f2 of the transponder are spatially superposed on each other.

Figure 13:
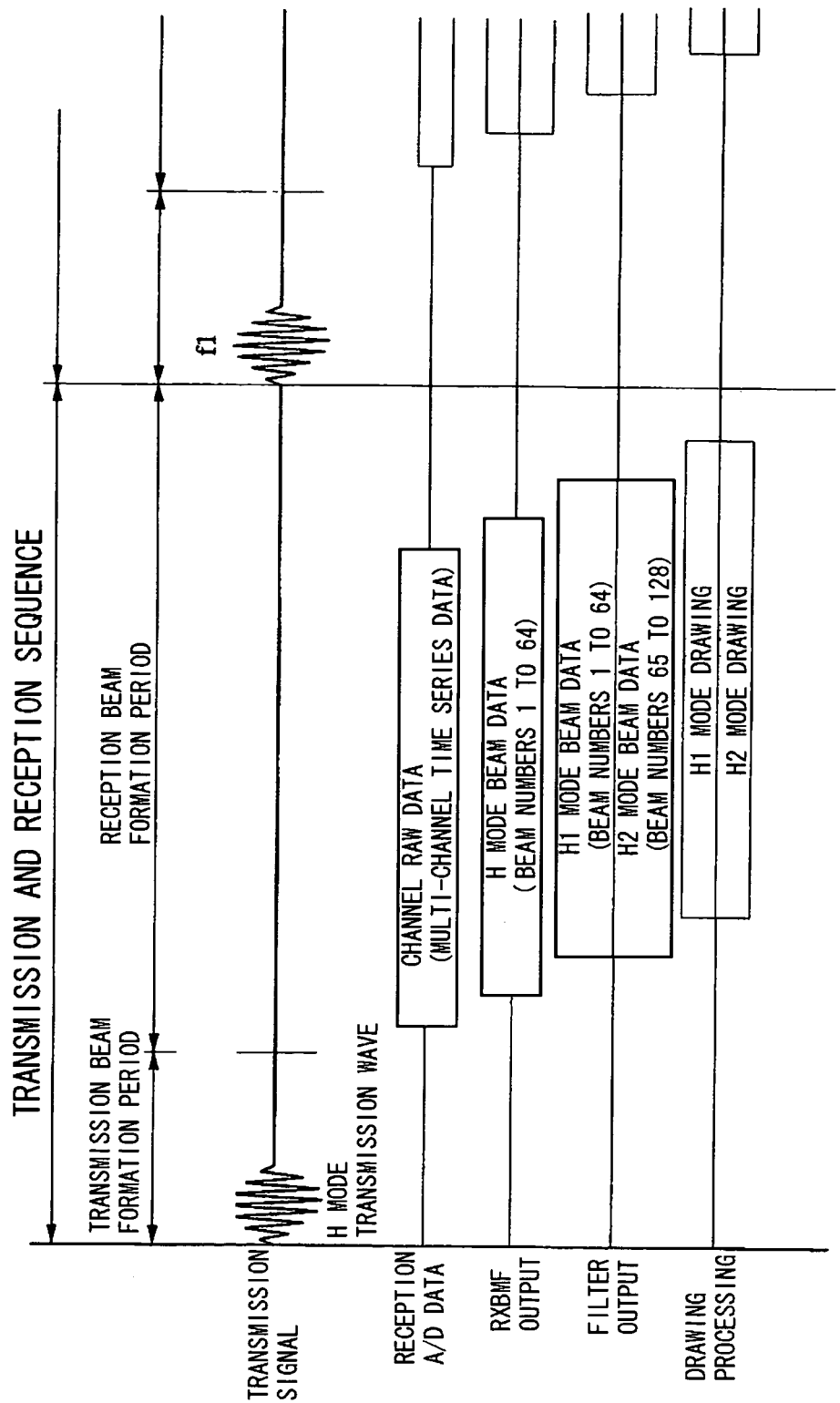
FIG. 13 is timing chart in a scanning sonar.

FIG. 13 shows a timing chart at the time of detection operation of the scanning sonar. In FIG. 13, a "transmission signal" typically indicates a drive waveform (transmission signal) given to one oscillator of plural oscillators of the transducer. In this example, the detection signal f1 (25 kHz) is outputted.

"Reception A/D data" is time series data converted by the A/D converter 19 shown in FIG. 10A. In a reception beam formation period, the time series data from each channel is processed.

In "RXBMF output", a reception beam to receive echo detection and a response signal of the transponder is formed by the processing of the programmable reception beam former 22 shown in FIG. 10B. In this example, the reception beam for echo detection and transponder detection is formed of 64 beams.

In "filter output", frequency filtering of 25 kHz for an echo detection mode (H1 mode) and frequency filtering of 24 kHz for a transponder detection mode (H2 mode) are performed.

In "drawing processing", with respect to the detection signal and the response signal obtained in this way, an envelope is detected by the envelope detection part 24 shown in FIG. 10B, image data of the detection signal and image data of the response signal are respectively generated in the image processing part 25, and they are displayed on the display operation part 26.

The above transmission beam formation period and the reception beam formation period subsequent thereto are made one transmission and reception sequence, and this is repeated.

Next, a scanning sonar according to a second embodiment will be described with reference to FIGS. 14 to 16.

In the example described above, although the example has been described in which the detection signal is used also as the activation signal of the transponder, an example in which the activation signal of the transponder is made a signal of a frequency different from the detection signal will next be described.

Figure 14:
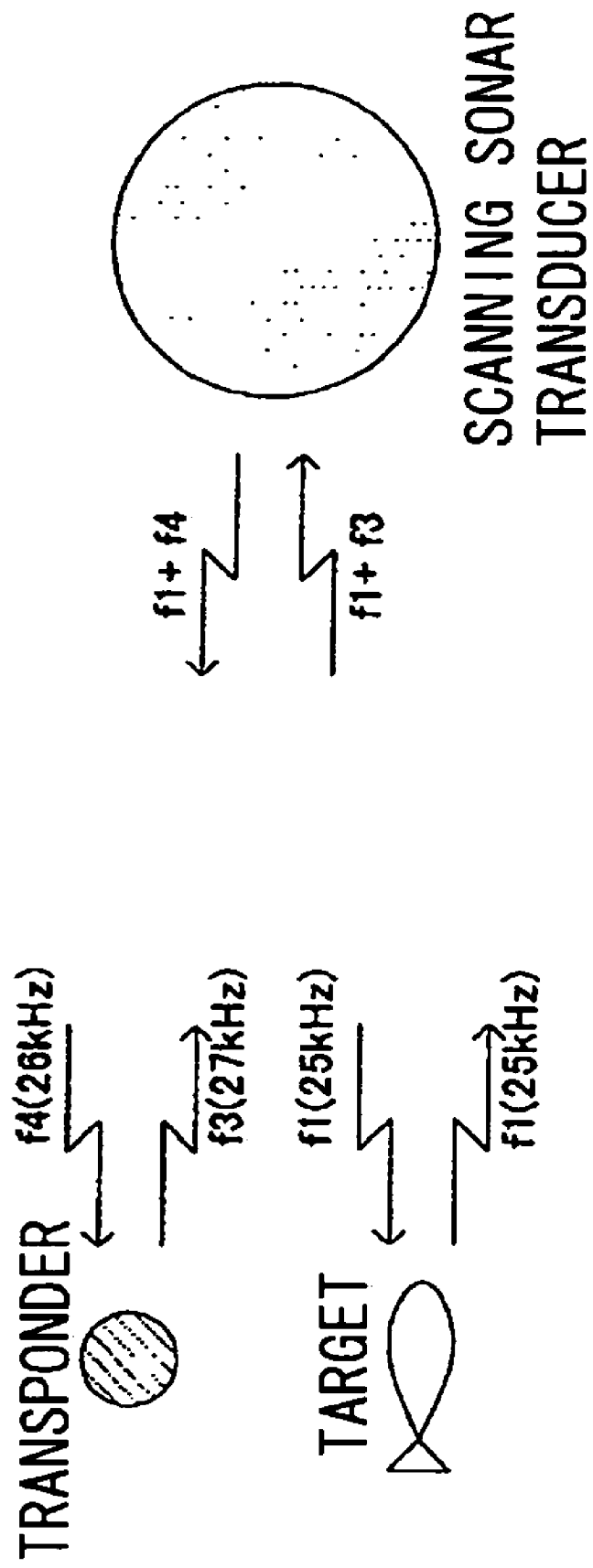
FIG. 14 is a view showing a relation of various signals among a transducer of a scanning sonar according to a second embodiment, a transponder and a target.

FIG. 14 shows a relation of transmission and reception signals among a transducer of a scanning sonar, a transponder and a target such as a fish school in that case. A detection signal f1 of 25 kHz and an activation signal f4 of 26 kHz are transmitted from the transducer of the scanning sonar. The transponder is activated by receiving this and transmits a response signal f3 of 27 kHz. The target passively reflects the detection signal f1. By this, the transducer of the scanning sonar receives signals in which the echo signal f1 and the response signal f3 of the transponder are spatially superposed on each other.

Figure 15:
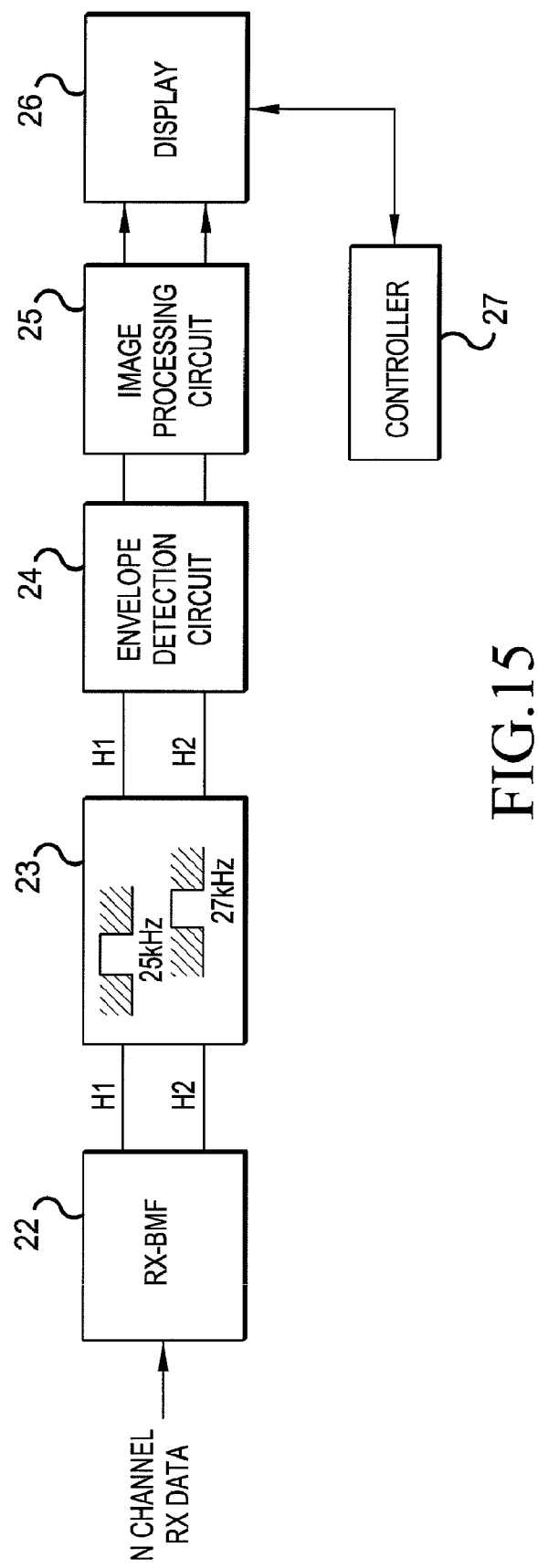
FIG. 15 is a block diagram showing a structure of a received signal processing part.

FIG. 15 is a block diagram showing a structure of a received signal processing part in this case. The structure of each transmission and reception channel and a transmission beam former is similar to that shown in FIG. 10A. However, the transmission beam former forms the transmission beam for transponder activation in addition to the transmission beam for echo detection.

In FIG. 15, a reception beam former 22 forms a reception beam for echo detection, and forms a reception beam for reception of a response signal from the transponder. A filter 23 allows a specified band with a center of 25 kHz to pass through with respect to the received signal H1 based on the reception beam for echo detection, and allows a specified band with a center of 27 kHz to pass through with respect to the received signal H2 based on the reception beam for reception of a response signal from the transponder. The others are the same as those shown in FIG. 10B.

Figure 16:
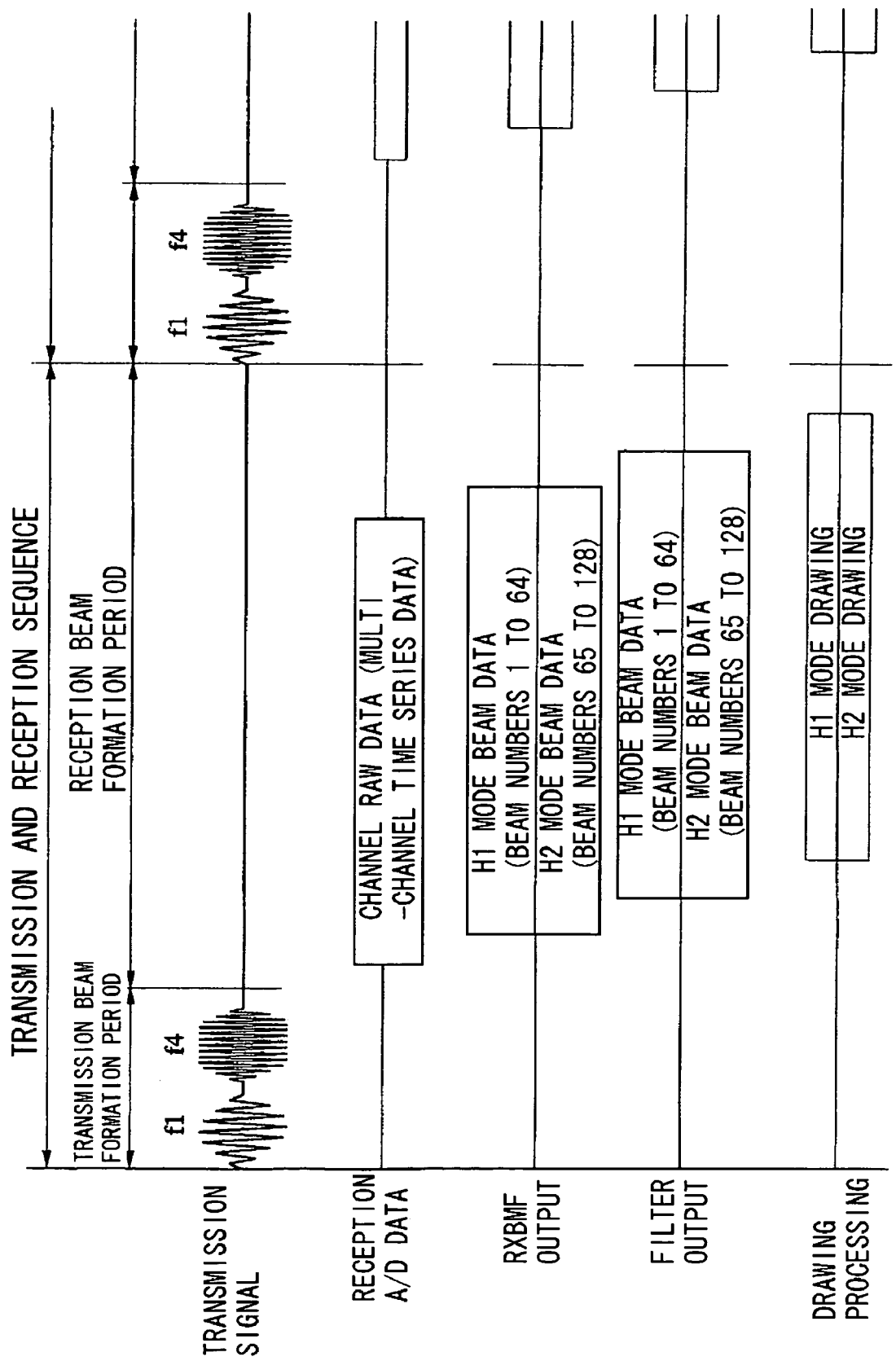
FIG. 16 is a timing chart in a scanning sonar.

FIG. 16 shows a timing chart at the time of detection operation of the scanning sonar. In FIG. 16, a "transmission signal" typically indicates a drive waveform (transmission signal) given to one oscillator among plural oscillators of the transducer. In this example, a detection signal f1 (25 kHz) for the H mode is transmitted, and a transponder activation signal f4 (26 kHz) is transmitted. The two signals are successively transmitted in a transmission beam formation period.

"Reception A/D data" is time series data converted by the A/D converter 19 shown in FIG. 10A. The time series data from each channel is processed during a reception beam formation period.

In "RXBMF output", a reception beam for receiving echo detection and a response signal of a transponder is formed by the processing of the programmable reception beam former 22 shown in FIG. 10B. In the case where the reception beam formation capacity of the programmable reception beam former 22 is 128 beams, 64 beams of beam numbers 1 to 64 are assigned to the mode (H1 mode) for echo detection, and 64 beams of beam numbers 65 to 128 are assigned to the mode (H2 mode) for transponder detection.

In "filter output", similarly to the case of the first embodiment, frequency filtering corresponding to each of the detection signal and the response signal is performed.

In "drawing processing", with respect to the detection signal and the response signal obtained in this way, an envelope is detected by the envelope detection part 24 shown in FIG. 10B, image data of the detection signal and image data of the response signal are respectively generated in the image processing part 25, and they are displayed on the display operation part 26.

The above transmission beam formation period and the reception beam formation period subsequent thereto are made one transmission and reception sequence, and this is repeated. Incidentally, since the transmission timing of the detection signal f1 and the transmission timing of the transponder activation signal f4 are not simultaneous, a correction of the time difference is performed at the time of drawing processing for the detection image and the position display of the transponder.

As stated above, in the case where the activation signal of the transponder is formed separately from the transmission beam of the detection signal, when the activation signal is transmitted by the transmission beam in which the beam is extended in the vertical direction, the detection of the transponder can be easily performed.

Incidentally, according to the method of generating the signal for transponder activation separately from the signal for echo detection as stated above, a modulation wave such as, for example, FM, PSK or FSK may be transmitted as the transponder activation signal. By that, the mixture of the activation signal of the transponder and the echo detection signal can be further suppressed. Besides, the transponder may transmit a modulation wave, such as FM, PSK or FSK, as the response signal. By that, the mixture of the response signal of the transponder and the echo signal can be further suppressed.

In the foregoing example, although the two transmission signals for the transmission beam formation are transmitted in time division in the transmission beam formation period, these may be simultaneously transmitted. That is, a composite signal of the detection signal f1 and the activation signal f4 is made one burst wave and may be transmitted at once.

Besides, in the foregoing example, although the detection of an echo is performed in the H mode, and the activation of the transponder is performed, similarly, the detection of an echo is performed in the V mode, and the activation of the transponder can also be performed. Further, in the H mode and the V mode, the detection of an echo and the activation of the transponder can be performed substantially at the same time. For example, in one transmission beam formation period, the transmission for the echo detection and the transponder activation is formed in the H mode, and the transmission beam for the echo detection and the transponder activation is formed in the V mode. Then, in the reception beam formation period, the reception beam for the echo detection and the transponder position detection is formed in the H mode, and further, the reception beam for the echo detection and the transponder position detection is formed in the V mode. As a result, as shown in FIGS. 3 and 4, the detection image display and the position display of the transponder in the H mode, and the detection image display and the position display of the transponder in the V mode can be performed.

Next, a scanning sonar according to a third embodiment will be described with reference to FIGS. 17A and 17B.

In some examples described above, the transponder exists in a specified detection range (section), and the transponder is activated by formation of the transmission beam to the detection range. In this third embodiment, the position of a transponder is tracked, and the activation signal to the transponder is optimized.

Figure 17A:
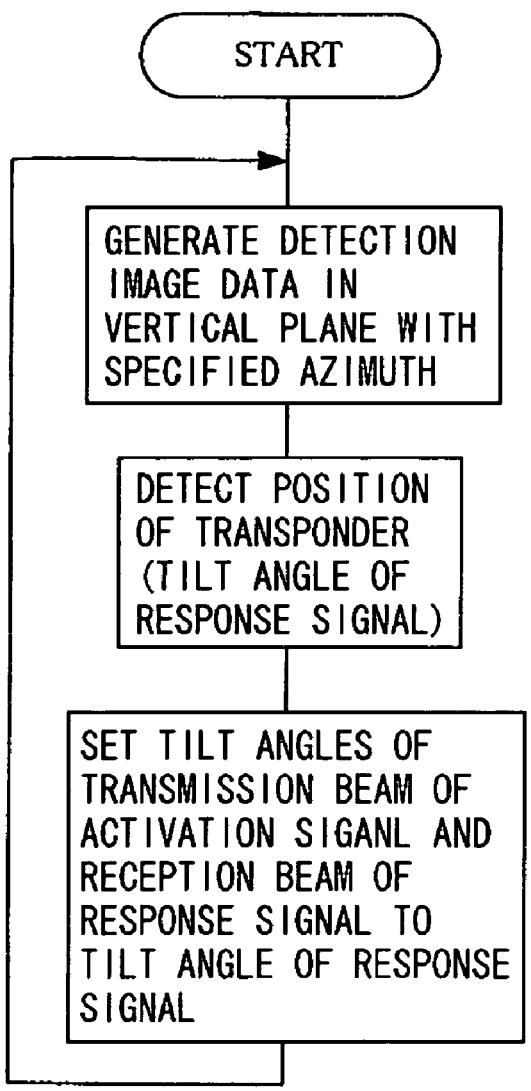
FIGS. 17A and 17B are flowcharts in a scanning sonar according to a third embodiment.
Figure 17B:
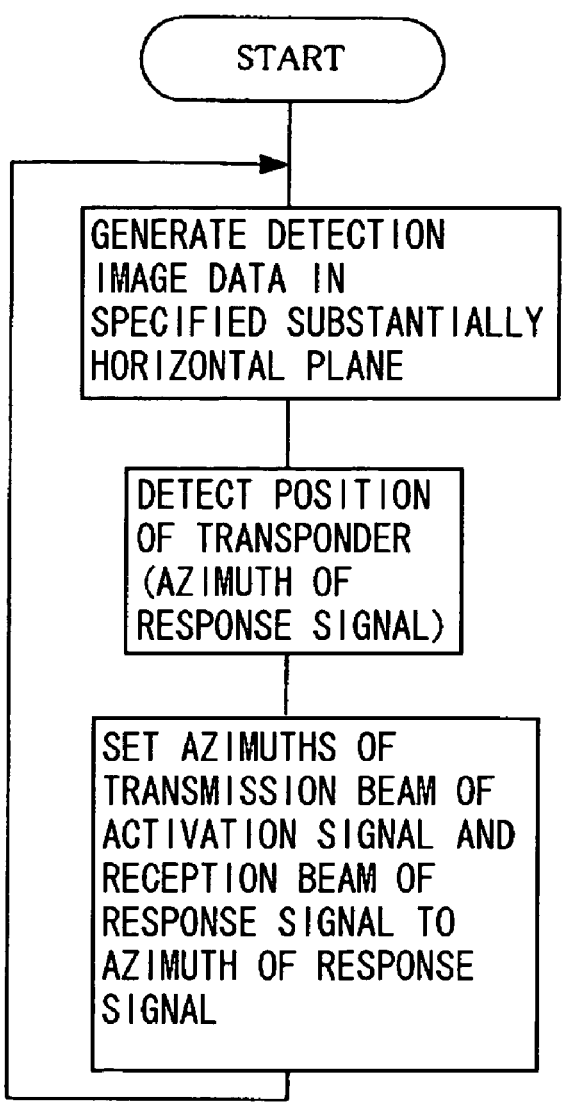

FIG. 17A shows a processing relating to a tilt angle. First, detection image data in a vertical plane at a specified azimuth is generated, and a position of the transponder in the vertical direction (tilt angle of the response signal from the transponder) is detected. Then, the tilt angle of the transmission beam of the activation signal and the tilt angle of the reception beam are made to match the tilt angle of the response signal. FIG. 17B shows a processing relating to an azimuth. First, detection image data in a specified substantially horizontal plane is generated, and a position of the transponder in the horizontal direction (azimuth of the response signal from the transponder) is detected. Then, the azimuth of the transmission beam of the activation signal and the azimuth of the reception beam are made to match the azimuth of the response signal.

The programmable transmission beam former 21 shown in FIG. 10A gives each transmission and reception channel the transmission control data to control the phase and weight with which each transmission and reception channel drives the oscillator, so that the transmission beam of the activation signal to the transponder becomes the pencil-type transmission beam with the set azimuth and the tilt angle. Besides, based on the reception data from each transmission and reception channel, the reception beam former 22 controls the phases and weights of the received signals by the respective oscillators and combines them, so that the pencil beam type reception beam is formed in the direction of the transponder, and the received signal is obtained.

Incidentally, in the example shown in FIG. 7, although the control is performed so that both the tilt angle and the azimuth of the transmission beam of the activation signal are directed toward the transponder, only one of the tilt angle and the azimuth may be controlled.

INDUSTRIAL APPLICABILITY

The invention can be used for an ultrasonic transmitting and receiving system for detecting underwater objects by transmitting and receiving ultrasonic waves.

The invention claimed is:

1. An ultrasonic transmitting and receiving system comprising:
   a sonar apparatus equipped on a ship and detecting underwater objects by a transmission beam formed with a detection signal and at least a reception beam formed with echo signals; and
   a transponder in water, the transponder transmitting a response signal having a frequency band different from a frequency band of the detection signal in response to an activation signal transmitted from the sonar apparatus and received thereby, the activation signal having a frequency band different from the frequency band of the detection signal; and
   wherein the sonar apparatus includes:
      a transmission beam former for transmitting the detection signal in a form of transmission beam, the transmission beam former having sections for separately forming the transmission beam of the detection signal to a detection range and a transmission beam of the activation signal to the transponder,
      a reception beam former for receiving an echo signal produced by an object reflecting the detection signal and the response signal, and
      an indicator for displaying the echo signal and the response signal; and
      wherein the transmission beam former forms the transmission beam of the activation signal to the transponder according to an azimuth from the sonar to the transponder or a tilt angle.

2. The ultrasonic transmitting and receiving system according to claim 1, wherein the transmission beam former performs formation of the transmission beam of the detection signal and formation of the transmission beam of the activation signal by one transmission and reception sequence.

3. The ultrasonic transmitting and receiving system according to any one of claims 1 or 2, wherein the transmission beam former forms transmission beams to respectively perform detection in a vertical plane substantially vertical to a water surface and including a position of the transponder and in a plane having a specified tilt angle and including the position of the transponder, the reception beam former forms reception beams in the vertical plane and the plane having the specified tilt angle respectively, and the indicator includes sections for collectively displaying images of the echo signal and the response signal in the vertical plane and the plane having the specified tile angle.

* * * * *

UNITED STATES PATENT AND TRADEMARK OFFICE
CERTIFICATE OF CORRECTION

PATENT NO. : 7,460,433 B2  
APPLICATION NO. : 10/554995  
DATED : December 2, 2008  
INVENTOR(S) : Yasushi Nishimori et al.

It is certified that error appears in the above-identified patent and that said Letters Patent is hereby corrected as shown below:

On the title page, item [75] should read:
    (75) Inventors: Yasushi Nishimori, Nishinomiya (JP);
                        Akira Okunishi, Nishinomiya (JP);
                        Kouzo Tokuyama, Nishinomiya (JP);
                        Koiji <u>Tokuda</u>, Nishinomiya (JP)

Signed and Sealed this

Ninth Day of June, 2009

JOHN DOLL  
*Acting Director of the United States Patent and Trademark Office*